United States Patent
Spiegel

(10) Patent No.: US 9,411,046 B2
(45) Date of Patent: Aug. 9, 2016

(54) DEVICE AND METHOD FOR GENERATING AND EVALUATING ULTRASOUND SIGNALS, PARTICULARLY FOR DETERMINING THE DISTANCE OF A VEHICLE FROM AN OBSTACLE

(71) Applicant: ELMOS Semiconductor AG, Dortmund (DE)

(72) Inventor: Egbert Spiegel, Dortmund (DE)

(73) Assignee: ELMOS SEMICONDUCTORS AG, Dortmund (DE)

( * ) Notice: Subject to any disclaimer, the term of this patent is extended or adjusted under 35 U.S.C. 154(b) by 54 days.

(21) Appl. No.: 14/409,436

(22) PCT Filed: Jun. 17, 2013

(86) PCT No.: PCT/EP2013/062521
§ 371 (c)(1),
(2) Date: Dec. 18, 2014

(87) PCT Pub. No.: WO2013/189887
PCT Pub. Date: Dec. 27, 2013

(65) Prior Publication Data
US 2015/0198714 A1    Jul. 16, 2015

(30) Foreign Application Priority Data

Jun. 19, 2012 (EP) .................. 12172516

(51) Int. Cl.
*G01S 15/10* (2006.01)
*G01S 15/02* (2006.01)
*G01S 7/52* (2006.01)
*G01S 13/93* (2006.01)

(52) U.S. Cl.
CPC . *G01S 15/10* (2013.01); *G01S 7/52* (2013.01); *G01S 13/931* (2013.01); *G01S 15/02* (2013.01)

(58) Field of Classification Search
CPC ....... G01S 13/931; G01S 15/10; G01S 15/02; G01S 7/52
See application file for complete search history.

(56) References Cited

U.S. PATENT DOCUMENTS

| 4,975,889 A | 12/1990 | Petrucelli et al. |
| 2015/0198714 A1* | 7/2015 | Spiegel ................. G01S 13/931 367/99 |

FOREIGN PATENT DOCUMENTS

| DE | 19721835 C2 | 3/2001 |
| DE | 102010033213 | 2/2012 |
| DE | WO 2013189887 A1 * | 12/2013 ............ G01S 13/931 |
| EP | 2081052 | 11/2011 |

OTHER PUBLICATIONS

International Preliminary Report on Patentability for PCT/EP2013/062521, English Translation.

* cited by examiner

*Primary Examiner* — Daniel Pihulic
(74) *Attorney, Agent, or Firm* — Patterson Intellectual Property Law, P.C.; Hilary Dorr Lang

(57) ABSTRACT

In the device and method for generating and evaluating ultrasound signals, particularly for determining the distance of a vehicle from an obstacle, an ultrasound received signal is received by at least one ultrasound receiver subscriber of a data bus, after a burst transmission signal comprising a plurality of ultrasound pulses and having a burst length has been transmitted by at least one ultrasound transmitter subscriber of the data bus. The ultrasound received signal is subdivided into time sections which are substantially equal to half the burst length. The peak value for each time section of the ultrasound received signal is transmitted via the data bus to a central control and evaluation unit. On the basis of the peak values of the received signal for each time section, taking into account threshold value tracking, it is determined in the control and evaluation unit whether the ultrasound received signal has time sections in which the ultrasound received signal is greater than the tracked threshold value or equal to the tracked threshold value.

12 Claims, No Drawings

DEVICE AND METHOD FOR GENERATING AND EVALUATING ULTRASOUND SIGNALS, PARTICULARLY FOR DETERMINING THE DISTANCE OF A VEHICLE FROM AN OBSTACLE

The invention relates to a device and a method for generating and evaluating ultrasound signals, particularly for determining the distance of a vehicle to an obstacle.

Devices of the above type are also referred to as Park Distance Control (PDC) systems and serve to assist the process of maneuvering a vehicle into a parking space. Such systems comprise a plurality of ultrasound transmitters and ultrasound receivers wherein respectively one ultrasound transmitter and one ultrasound receiver can be combined into an ultrasound transducer. If an emitted ultrasound signal is reflected by an obstacle or object within a presettable safety distance in a monitored area near the vehicle, an echo can be detected in the received signal. Regrettably, the echo detection is not unambiguous, which is caused by dispersion, interference and noise signal components. The decision as to whether or not an echo has been received is mostly performed by comparing the received signal to a threshold value. It is suitable if the threshold value computation is performed automatically and the threshold value will be tracked correspondingly. Such a tracking and computation of the threshold value is described e.g. in DE-C-197 21 835.

The tracking and computation of the threshold value is relatively computation-intensive. A large number of data are involved. Usually, several ultrasound transducers are connected via a data bus system to a central control unit. Thus, the tracking and computation of the threshold value entails the necessity of transmitting and receiving relatively large amounts of data via the data bus. This, however, will require a powerful and thus comparatively expensive data bus. If, however, one would wish to use a simple data bus, the processing of the received signals for the tracking and computation of the threshold value would have to performed in a decentralized manner in each subscriber, i.e. in the electronics arranged downstream of each ultrasound transducer. Also this approach is very complex.

From EP-A-2 081 052, there is known a detection device and respectively a detection method for detection of vehicles in the area around a driving vehicle. Herein, especially the area of the "blind spots" shall be monitored. For the functional safety of the known detection device, the continuous monitoring of the ultrasound transmitters and receivers which are used is of decisive importance. The signals captured by these functional elements are subjected to a continuous comparison of a cyclical or spot-check-like type. Upon interruption of the signals of one of these functional elements, there is performed an adjustment or parameterization of its transmission/reception area onto a to-be-detected roadway ground, in such a manner that the relevant functional element in case of functional integrity is positively set for reception of signal reflections via the roadway ground. This allows for blindness detection through the correlation of the signals from the measuring sensors and respectively functional elements. In this known method, the individual functional elements are connected via data lines to a control device. Said document does not give further information on the structuring of the data.

DE-A 10 2010 033 213 describes a method and a device for evaluation of signals of a an ultrasound sensor for capturing the environment. Herein, a plurality of ultrasound transmitters and receivers are connected to a central unit. On the basis of the temporal intervals of echo signal sequences, the sensors will detect corresponding clusters and will then transmit this cluster information to the central unit.

A further ultrasound measurement device for distance measurement is known from U.S. Pat. No. 4,975,889.

It is a an object of the invention to provide a device and a method for generating and evaluating ultrasound signals, particularly for determining a distance of a vehicle to an obstacle, wherein an automatic computing and tracking of a threshold value is to be performed while, however, use shall be made of simplified hardware components.

To achieve the above object, the invention proposes a device for generating and evaluating ultrasound signals, particularly for determining the distance of a vehicle to an obstacle, wherein the device is provided with a data bus for transmission of useful data and control data between at least one ultrasound transmitter subscriber, at least one ultrasound receiver subscriber and a central control and evaluation unit for controlling the at least one ultrasound transmitter subscriber and the at least one ultrasound receiver subscriber and for evaluation of the received signal of the ultrasound receiver subscriber, performed while tracking a threshold value, under the aspect of whether this received signal at least for a time period is larger than or equal to the tracked threshold value, particularly for obtaining the distance to an obstacle if such an obstacle exist within a distance area of a presettable size, the ultrasound transmitter subscriber comprising an ultrasonic transmitter for emitting a burst transmission signal which has a burst length and comprises a plurality of ultrasonic pulses, and the ultrasound receiver subscriber comprising an ultrasonic receiver for receiving, as an ultrasonic received signal, a burst transmission signal reflected at an obstacle, and comprising a signal processing unit for processing the received signal received by the ultrasonic receiver, with the received signal being divided, from the start of an emission of the ultrasound burst transmission signal, into individual time sections (so-called cells) of a length substantially equal to half of the burst length.

In this device, it is provided, according to the invention, that the signal processing unit is operative to determine, for each time section, a peak value of the received signal, that the at least one ultrasound receiver subscriber is operative to transmit the peak values of the time sections of the received signal via the data bus to the central control and evaluation unit, and that, on the basis of the peak values received from the at least one ultrasound receiver subscriber via the data bus, the control and evaluation unit, particularly for obtaining the distance to a potential obstacle, is operative to detect whether the received signal in at least one of the time sections is larger than or equal to the tracked threshold value.

To achieve the above object, the invention also proposes a method for generating and evaluating ultrasound signals, particularly for determining the distance of a vehicle to an obstacle, wherein, in said method an ultrasound received signal is received by at least one ultrasound receiver subscriber of a data bus after a burst transmission signal having a burst length and comprising a plurality of ultrasonic pulses has been emitted by at least one ultrasound transmitter subscriber of the data bus, the ultrasound received signal is divided into time sections substantially equal to half of the burst length, for each time section of the ultrasound received signal, the peak value is transmitted via the data bus to a central control and evaluation unit, and on the basis of the peak values of the ultrasound received signal for each time section, it is determined in the control and evaluation unit under consideration of a threshold value tracking whether the ultrasound received signal comprises time sections in which the ultrasound received signal is larger than or equal to the tracked threshold value.

According to the invention, it is provided, in a general sense, that the automatic computation and tracking of the threshold value will be performed centrally in a control and evaluation unit which is connected via a data bus to the ultrasound transmitter and ultrasound receiver subscribers. Each ultrasound transmitter subscriber comprises an ultrasound transmitter for emitting a burst transmission signal which has a burst length and comprises a plurality of ultrasonic pulses. Each ultrasound receiver subscriber is provided with an ultrasound receiver for receiving an ultrasound signal. This ultrasound received signal is e.g. the burst transmission signal that has been transmitted by an ultrasound transmitter subscriber and has been reflected at an obstacle. Connected downstream of the ultrasound receiver is a signal processing unit for processing the received ultrasound signal. In the process, the received ultrasound signal will be subdivided into individual time sections, so-called cells, which are substantially equal to half of the burst length. This subdividing of the received signal is carried out at the start of the emission of the ultrasound burst transmission signal.

According to the invention, the transmission of the data from the ultrasound receiver subscribers to the control and evaluation unit is reduced. Namely, each ultrasound receiver subscriber will substantially transmit only the peak value of the received signal for each cell. The peak values for each cell are sufficient for performing an automatic threshold value computation and tracking in the control and evaluation unit.

Therefore, according to the invention, the reduced amount of data makes it possible to perform an automatic threshold value computation and tracking. The invention thus offers the opportunity to transmit the echo data simultaneously with their generation and to process them externally and without noteworthy losses. For the computation of the threshold value in the ultrasound receiver subscriber IC, no extensive temporary storage devices are required. Thus, in the invention, use is made of the threshold value tracking and computation on the basis of minimum possible amounts of data which are transmitted by the ultrasound receiver subscribers and after evaluation of the ultrasound burst received signal. Such a threshold value computation and tracking is reasonable particularly under the aspect that, now, safe detection of objects across larger distances will be possible also in case of heavily varying environmental conditions (underground garage, free space).

According to an advantageous embodiment of the invention, it is provided that the signal processing unit of the at least one ultrasound receiver subscriber will detect, for each time section, also the average value of the received signal, and that the at least one ultrasound receiver subscriber will also transmit, via the data bus, the average values for each time section to the control and evaluation unit. By the additional transmission of the average value of the received signal for each time section, i.e. for each cell, the automatic threshold value computation and tracking can be performed still faster. Since, now, an average value has been transmitted for each time section of the received signal, the control and evaluation unit can compute, from these average values, the average value of the received signal over all of its time sections. This computation in turn can be considered in the automatic threshold value computation and tracking.

It is suitable if the data bus has connected to it a plurality of ultrasound transmitter subscribers and a plurality of ultrasound receiver subscribers.

As already mentioned, the at least one ultrasound transmitter subscriber and the at least one ultrasound receiver subscriber or respectively a pair of ultrasound transmitter subscriber and ultrasound receiver subscriber can be designed as a common subscriber of the data bus, wherein the ultrasound transmitter and the ultrasound receiver are combined into one unit in the form of an ultrasound transducer.

Further, it can be provided that the data bus has a plurality of ultrasound receiver subscribers connected to it, the number of the ultrasound receiver subscribers being larger or smaller than the number of ultrasound receiver subscribers.

Finally, according to a further embodiment of the invention, it is provided that, on the basis of the peak values and optionally average values for each time section of the received signal of the at least one ultrasound receiver subscriber as received via the data bus, the control and evaluation unit will detect a potential echo and, on the basis of the length of time between the start of the emission of the ultrasound burst transmission signal and the occurrence of the echo, will determine the distance to a potential obstacle.

In the known methods for automatic threshold value computation and tracking in systems comprising e.g. a data bus and ICs, connected thereto, of a plurality of ultrasound receiver subscribers, the measurement range will be subdivided into a plurality of individual sections (so-called cells), which means that the ultrasound received signal will be subdivided into these time sections. The time sections and respectively cells have a length which is substantially equal to half of the pulse (burst) length. The size of the sections corresponds to the resolution of two echo signals. In the state of the art, for computation of the threshold value in the area of a cell x, the developments in the cells to the left and to the right of the observed cells are referred to. All known methods have in common that they are based on the average value of the received signals in the cells.

The method of the invention is different from the state of the art in which the average values are not necessarily included in the computations. For the decision as to whether an echo exists, the thus computed threshold value will be compared to the echo signal. For this purpose, intermediate storage of the echo signal is required. Tests have shown that, in practice, it is entirely sufficient to consider only the peak value of the echo signal for each cell. Even though the spatial resolution is slightly decreased, it is guaranteed that no echo will be lost, i.e. that all echoes will be detected. The echo signal itself will be correctly represented in its essential components (especially with respect to its signal levels) by the peak values for each cell. By increased abandonment of spatial resolution, which is justified in case of remote objects that are still to be detected, the amount of data for each received signal can be further reduced by enlargement of the cells.

The invention claimed is:

1. A device for generating and evaluating ultrasound signals for determining the distance of a vehicle to an obstacle, comprising
   a data bus for transmission of useful data and control data be-tween at least one ultrasound transmitter subscriber, at least one ultrasound receiver subscriber and a central control and evaluation unit for controlling the at least one ultrasound transmitter subscriber and the at least one ultrasound receiver subscriber and for evaluation of the received signal of the ultrasound receiver subscriber, performed while tracking a threshold value, under the aspect of whether this received signal at least for a time period is larger than or equal to the tracked threshold value, particularly for obtaining the distance to an obstacle if such an obstacle exist within a distance area of a presettable size, wherein the ultrasound transmitter subscriber comprises an ultrasonic transmitter for emitting a burst transmission signal which has a burst length and comprises a plurality of ultrasonic pulses, and wherein the ultrasound receiver subscriber comprises an ultrasonic receiver for receiving, as an ultrasonic received signal, a burst transmission signal reflected at an obstacle, and comprising a signal processing unit for processing the received signal received by the ultrasonic receiver, with the received signal being divided, from the start of an emission of the ultrasound burst transmission signal, into individual time sections of a length substantially equal to half of the burst length, characterized in:

that the signal processing unit is operative to determine, for each time section, a peak value of the received signal, that the at least one ultrasound receiver subscriber is operative to transmit the peak values of the time sections of the received signal via the data bus to the central control and evaluation unit, and that, on the basis of the peak values received from the at least one ultrasound receiver subscriber via the data bus, the control and evaluation unit is operative to detect whether the received signal in at least one of the time sections is larger than or equal to the tracked threshold value.

2. The device according to claim 1, wherein the signal processing unit of the at least one ultrasound receiver subscriber is operative to detect, for each time section, the average value of the received signal and wherein the at least one ultrasound receiver subscriber is operative to transmit, via the data bus, the average values for each time section to the control and evaluation unit.

3. The device according to claim 1, wherein the data bus has connected to it a plurality of ultrasound transmitter subscribers and a plurality of ultrasound receiver subscribers.

4. The device according to claim 1, wherein the at least one ultrasound transmitter subscriber and the at least one ultrasound receiver subscriber or respectively a pair of ultrasound transmitter subscriber and ultrasound receiver subscriber are designed as a common subscriber of the data bus, the ultrasound transmitter and the ultrasound receiver being combined into one unit in the form of an ultrasound transducer.

5. The device according to claim 1, wherein the data bus has a plurality of ultrasound transmitter subscribers an a plurality of ultrasound receiver subscribers connected to it, the number of the ultrasound transmitter subscribers being larger than the number of ultrasound receiver subscribers.

6. The device according to claim 1, wherein, on the basis of the peak values and optionally average values for each time section of the received signal of the at least one ultrasound receiver subscriber as received via the data bus, the control and evaluation unit is operative to detect a potential echo and, on the basis of the length of time between the start of the emission of the ultrasound burst transmission signal and the occurrence of the echo, to determine the distance to a potential obstacle.

7. A method for generating and evaluating ultrasound signals, particularly for determining the distance of a vehicle to an obstacle, wherein, in said method an ultrasound received signal is received by at least one ultrasound receiver subscriber of a data bus after a burst transmission signal having a burst length and comprising a plurality of ultrasonic pulses has been emitted by at least one ultrasound transmitter subscriber of the data bus, wherein the ultrasound received signal is divided into time sections substantially equal to half of the burst length, wherein for each time section of the ultrasound received signal, the peak value is transmitted via the data bus to a central control and evaluation unit, and wherein on the basis of the peak values of the ultrasound received signal for each time section, it is determined in the control and evaluation unit under consideration of a threshold value tracking whether the ultrasound received signal comprises time sections in which the ultrasound received signal is larger than or equal to the tracked threshold value.

8. The method according to claim 7, wherein the signal processing unit of the at least one ultrasound receiver subscriber is operative to detect, for each time section, the average value of the received signal, and wherein the at least one ultrasound receiver subscriber is operative to transmit, via the data bus, the average values for each time section to the control and evaluation unit.

9. The method according to claim 7, wherein the data bus has connected to it a plurality of ultrasound transmitter subscribers and a plurality of ultrasound receiver subscribers.

10. The method according to claim 7, wherein the at least one ultrasound transmitter subscriber and the at least one ultrasound receiver subscriber or respectively a pair of ultrasound transmitter subscriber and ultrasound receiver subscriber are designed as a common subscriber of the data bus, the ultrasound transmitter and the ultrasound receiver being combined into one unit in the form of an ultrasound transducer.

11. The method according to claim 7, wherein the data bus has a plurality of ultrasound transmitter subscribers and a plurality of ultrasound receiver subscribers connected to it, the number of the ultrasound transmitter subscribers being larger than the number of ultrasound receiver subscribers.

12. The method according to claim 7, wherein, on the basis of the peak values for each time section of the received signal of the at least one ultrasound receiver subscriber as received via the data bus, the control and evaluation unit is operative to detect a potential echo and, on the basis of the length of time between the start of the emission of the ultrasound burst transmission signal and the occurrence of the echo, to determine the distance to a potential obstacle.

* * * * *